UNITED STATES PATENT OFFICE.

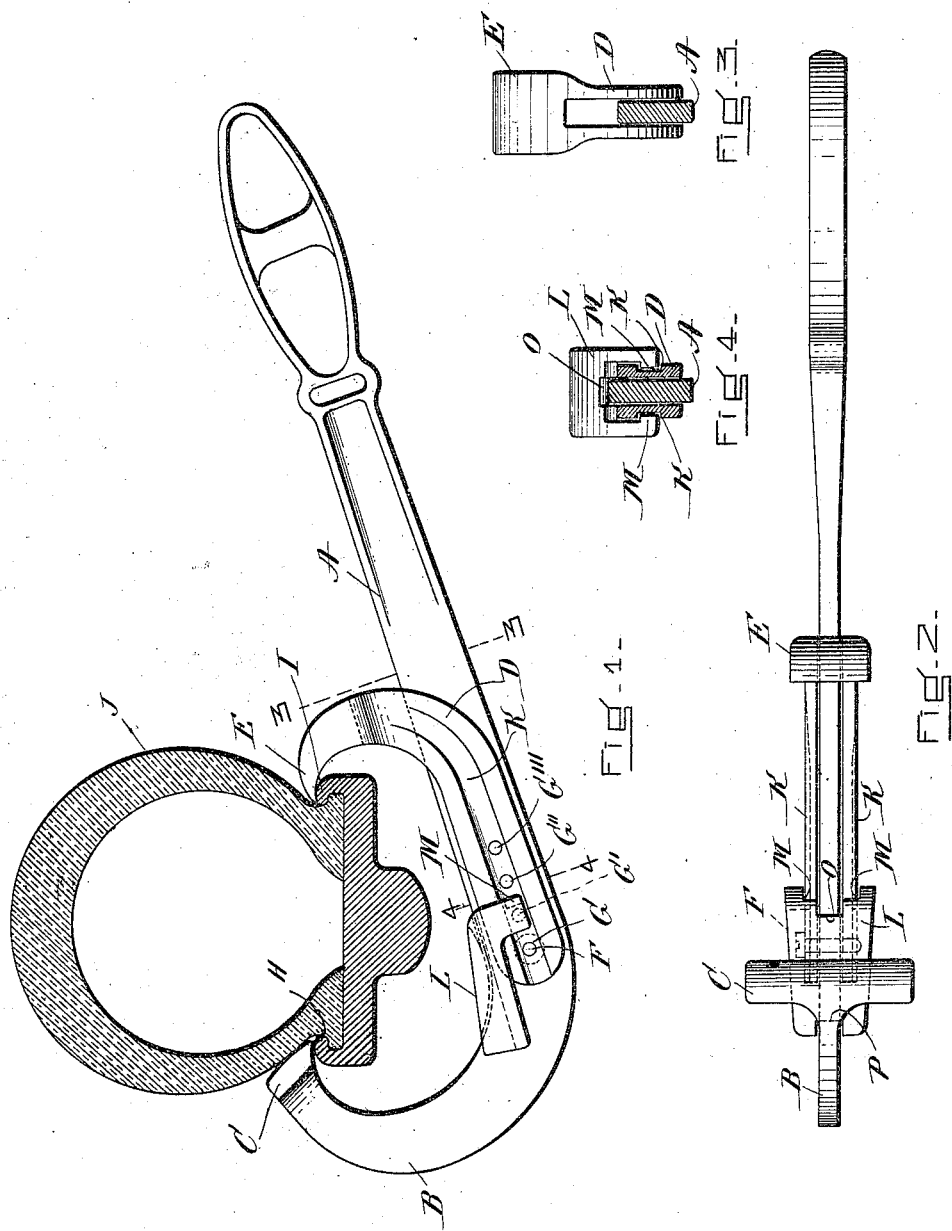

STEPHEN C. PLANT, OF BROOKLINE, MASSACHUSETTS.

TIRE-REMOVER.

990,387.

Specification of Letters Patent. Patented Apr. 25, 1911.

Application filed February 10, 1911. Serial No. 607,757.

*To all whom it may concern:*

Be it known that I, STEPHEN C. PLANT, a citizen of the United States, and a resident of Brookline, in the county of Norfolk and State of Massach etts, have invented a new and useful Improvement in Tire-Removers, of which the following is a specification.

Heretofore, so far as I am aware, devices for removing tire shoes from wheel rims have been constructed to loosen the outer side of the flange of the shoe from the rim, thereby allowing the shoe to be removed. However, it has been found in practice that the inner side of the shoe, or the side adjacent to the vehicle, often becomes tightly attached to the rim by rusting or otherwise, and accordingly it is the object of the present invention to provide a tire-remover which will operate against the inner side of the shoe, so that when such inner side becomes loosened from the rim, the removal of the tire may be easily effected.

One embodiment of my invention is shown in the drawings which accompany and form a part of this specification.

In the drawings, Figure 1 is a side view of my improved tire-remover illustrating the method of using the same. Fig. 2 is a plan view of said tire-remover, and Figs. 3 and 4 are sections taken on the lines 3—3 and 4—4, respectively.

In the particular drawings selected for illustrating my invention, A represents a handle terminating in a curved claw B, which in turn is provided with a lateral extension C affording a broad bearing surface for coöperation with the tire shoe J. Pivoted to the handle by the screw F or other suitable means, is a hook D provided with a curved end E which is arranged to bear against the outer side I of the wheel rim, so as to afford a fulcrum for the tire iron. As shown, the hook D preferably is split and straddles the handle, and its outer curved end E may, as shown, be broader than the split portion. Preferably the hook D is provided with a plurality of holes G G' G'' G''', so that the implement may be adjusted for use with rims of different widths.

The operation is as follows: The tire-iron having been properly adjusted, the hook E is placed on the outer side I of the rim and the lateral extension C is placed against the inner side H of the shoe, and thereupon by forcing the handle downwardly, the said extension C is moved outwardly against the shoe, thereby loosening the same from the rim. The inner side H of the shoe having been loosened from the rim, the entire shoe is now readily removed.

It has been found in practice that when the inner side of the shoe is very tightly rusted to its rim, the downward movement of the handle will force the lateral extension C upwardly along the surface of the shoe instead of outwardly toward the operator as is necessary in order to loosen the inner side H of the shoe. To overcome this defect I may provide a wedge L arranged to move relatively with respect to the tire-remover and to coöperate with the rim so as to prevent the upward movement aforesaid of the extension C along the tire. In the present instance, the wedge L is provided with a central longitudinal groove terminating in the slots O, P, and straddles the handle A. It is also provided with lugs M M which take into the grooves K K of the hook D, so that during the operation of the device the wedge will slide in said grooves until the upper portion thereof coacts with the lower part of the rim. It will be noted that the screw F will prevent the wedge from leaving said grooves.

In using the device, the operator, after adjusting the hook E on the outer side of the rim and the lateral extension C against the inner side of the shoe will move the wedge along the handle A until it is in the proper position to co-act with the under side of the rim.

It will be understood that various modifications in the device herein described and illustrated may be made by those skilled in the art without departing from the spirit of my invention.

I claim:

1. A tire-iron comprising a handle terminating in a claw, said claw being provided with a lateral extension arranged to coöperate with the inner side of the shoe, a hook pivoted to said handle and arranged to rest on the outer side of the wheel rim to afford a fulcrum for the tire-iron, and means having sliding engagement with said hook for preventing said lateral extension from slipping upwardly along the shoe.

2. A tire-iron comprising a handle terminating in a claw, said claw being provided with a lateral extension arranged to coöperate with the inner side of the shoe, a hook pivoted to said handle and arranged to rest on the outer side of the wheel rim to afford a fulcrum for the tire-iron, and a wedge in sliding engagement with said hook and arranged to move relatively to said handle and to coöperate with the lower part of said rim.

3. A tire-iron comprising a handle terminating in a claw, said claw being provided with a lateral extension arranged to coöperate with the inner side of the shoe, a hook pivoted to said handle and arranged to rest on the outer side of the wheel rim to afford a fulcrum for the tire-iron, a wedge arranged to straddle said handle and to coöperate with the lower part of said rim and means uniting said wedge and hook for relative movement.

4. A tire-iron comprising a handle terminating in a claw, said claw being provided with a lateral extension arranged to coöperate with the inner side of the shoe, a hook pivoted to said handle and arranged to rest on the outer side of the wheel rim to afford a fulcrum for the tire-iron, said hook being provided with longitudinally extending grooves, a wedge arranged to straddle said handle and to coöperate with the lower part of said rim, and lugs on said wedge arranged to slide in said grooves.

In testimony whereof, I have hereunto subscribed my name this 9th day of February, 1911.

STEPHEN C. PLANT.

Witnesses:
EDWIN C. BARKER,
GEO. K. WOODWORTH.

---

Copies of this patent may be obtained for five cents each, by addressing the "Commissioner of Patents, Washington, D. C."